Sept. 26, 1939.  L. F. WHITNEY  2,174,301
REFRIGERATING SYSTEM
Filed May 11, 1938
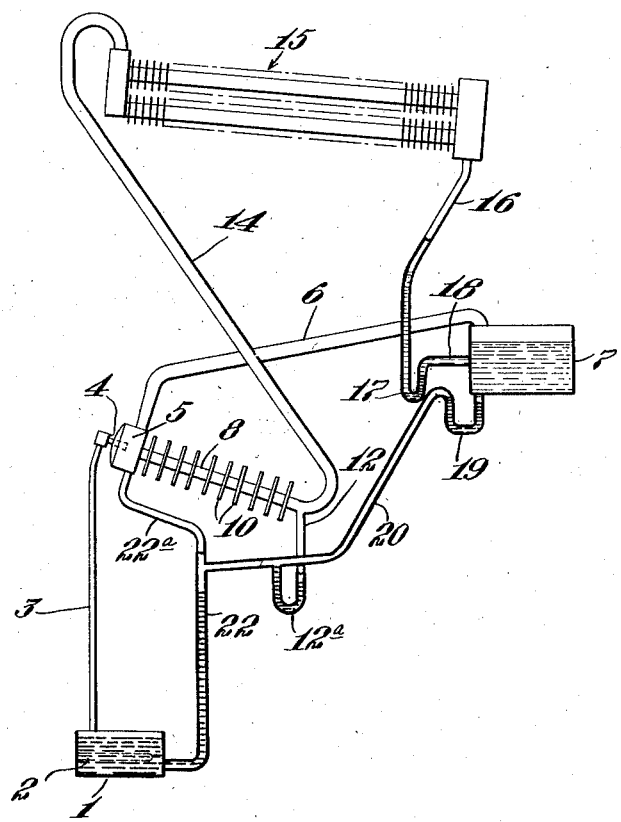
Inventor
Lyman F. Whitney
by Roberts, Cushman & Woodbury.
Att'ys.

Patented Sept. 26, 1939

2,174,301

UNITED STATES PATENT OFFICE 2,174,301

REFRIGERATING SYSTEM

Lyman F. Whitney, Cambridge, Mass., assignor, by mesne assignments, to Stator Corporation, a corporation of Rhode Island Application May 11, 1938, Serial No. 207,269

11 Claims. (Cl. 62—115)

This invention relates to improved refrigerating apparatus of the general type disclosed in United States Patent No. 1,761,551 of Eastman A. Weaver, which employs mercury as a propellant and employs an aqueous refrigerant.

The first systems of this type were hermetically sealed after the air had been withdrawn therefrom. However, it was found that non-condensable gases gradually appeared in small quantities in such systems, and after a considerable period of time impaired the operating efficiency thereof. It was observed that such gases might be due to minute leaks through the walls of the system or might have occluded on the steel walls of the same. Systems of this character have therefore been commonly provided with purgers such as disclosed in United States Patent No. 1,892,869 of Daniel F. Comstock. Such a purger is effective in exhausting gas from the system at slow rate, and when non-condensable gases do not appear in the system, the latter exhausts only refrigerant vapor from the system. Even if no gases appear in the system, the capacity of the purger is so small that the refrigerant would not be exhausted from the system for many years.

While systems of this character have been made of ordinary steel and have included aqueous refrigerants, under the existing conditions of air exhaustion and low pressures, only a minute quantity of scale resulted from oxidization of the steel walls of the system in the refrigerant-containing portions thereof. Thus the amount of scale evolved in a system of this character was long regarded as substantially negligible and a factor that could readily be taken care of in the design of the system.

However, I have observed that a substantial portion of the non-condensable gases exhausted by the purger may be in the form of hydrogen, and also I have further observed that apparently interactions between the steel walls, the refrigerant, and the mercury tended to cause the formation of a sludge in the system. The formation of gases in the system is apparently due in a large measure to gradual, slight interaction between the refrigerant and the ordinary steel walls of the system. Although this interaction was so slight as to result in the formation of an almost negligible quantity of scale, it apparently was sufficient to increase the tendency toward sludge formation, as well as the formation of a substantial fraction of the total quantity of non-condensable gases which are exhausted by the purger.

While water and mercury are liquids which are substantially immiscible under all ordinary conditions, under certain operating conditions very fine particles of mercury such as are provided by mercury vapor or mercury fog, when contacting water, tend to assume an extremely finely dispersed condition in the water to form therewith a more or less stable sludge. For example, when some mercury passes with the water vapor to the refrigerant condenser, a sludge may be formed. This sludge drains to the cooler, where it may gradually become heavier as more sludge is received from the condenser. Furthermore, mercury vapor or fog may occasionally pass directly from the aspirator mixing chamber into direct contact with the aqueous refrigerant in the cooler, thus causing the formation of a sludge. The tendency to form sludge is often greatly aggravated in systems having walls of ordinary steel. The proportions of mercury and water in the sludge may vary widely, and the sludge in many respects resembles mud.

I call suspension of mercury in water a sludge suspension. Depending upon operating conditions, this suspension may be either lean or rich in the mercury. If only a thin sludge suspension exists in the system, the effects are negligible. However, mercury tends to settle to the bottom of a body of such sludge suspension; the settling mercury may not coalesce, but may rather cause the formation of a mud-like sludge deposit. Should the factors that cause the original suspension continue to be present, they cause the formation of further sludge suspension from which additional mercury settles, thus augmenting the mud-like deposit. When the sludge suspension is relatively rich in mercury, the tendency to form the mud-like deposit is increased. Any type of sludge except a thin sludge suspension is deleterious because it involves a collection of mercury where it is not needed, thus materially increasing the total amount of the relatively expensive mercury required in the system. A sludge deposit is also deleterious since it tends to impede free circulation of the fluids through pipes of relatively small diameters.

Objects of the present invention are to provide a system in which the formation of hydrogen is substantially prevented and/or in which the formation of a sludge by the refrigerant and mercury is substantially prevented, as well as to permit the freezing point of the refrigerant to be substantially below 32° F., when desired.

It is possible to construct and install a system of this character with its parts so effectively sealed that the leakage of atmospheric air into the system is practically precluded, so that, in so far as this factor is concerned, the system will operate satisfactorily over a long period of time without a purger. Consequently if the internal development of non-condensable gases, such as hydrogen is also prevented, as taught by this invention, it is possible to provide a practical, long-lived system without a purger.

My copending application, Serial No. 207,267, filed on even date herewith, discloses various anti-freeze agents which may be employed in solution with water to permit the cooler to operate at a temperature substantially below 32° F. Among such agents are methyl Cellosolve and ethylene diamine. Commercially obtainable methyl Cellosolve, however, has the disadvantage under certain operating conditions of increasing the tendency of water to interact with mercury in causing the formation of a sludge in the system. Accordingly, as taught in my above-identified application, when methyl Cellosolve is employed as a refrigerant, it may be desirable to employ means to break up the sludge which thus forms and/or, as disclosed in my copending application Serial No. 207,268, filed on even date herewith, the system may be provided with means to prevent the formation of sludge.

Ethylene diamine not only avoids these objectionable characteristics of methyl Cellosolve, but even tends to preclude the formation of sludge. Thus, for example, when a substantial proportion of ethylene diamine is employed with methyl Cellosolve in an aqueous solution, the formation of a deleterious sludge is substantially prevented by the effect of the ethylene diamine. When ethylene diamine is used alone in solution with water in varying proportions, it also has a distinct tendency to impede the formation of a deleterious sludge, even in a system formed of ordinary steel which tends to aggravate sludge formation. On the other hand, ethylene diamine, when included in the refrigerant, tends to cause deterioration of the walls of certain parts of a conventional steel system and to increase the formation of hydrogen. The present invention provides a refrigerating system which may employ an aqueous refrigerant, even including a substantial proportion of ethylene diamine, without objectionable deterioration of the walls of the system and without the formation of deleterious sludge, while the freezing point of the refrigerant may be substantially below 32° F., if desired. The present invention also affords a system in which the tendency to form hydrogen is greatly reduced even in the presence of substantial quantities of ethylene diamine.

To permit these desirable results, I prefer to employ a system in which the walls of the refrigerant circuit have inner surfaces which are resistant to interaction with the refrigerant or with mercury. For these purposes, the cooler, the condenser and associated piping may be formed of certain types of corrosion-resistant stainless steel, or may be chromium plated or may receive other suitable treatment.

While I prefer ethylene diamine as an anti-sludge agent, I also am aware that various other anti-sludge agents may be employed. In general I have found that materials which are good electrolytes (especially alkali electrolytes) have a tendency to reduce or eliminate sludge formation, possibly due to some electrical phenomenon. It is desirable, however, for such an anti-sludge agent to be volatile so that it may pass into the vapor phase with the water and may consequently be received in the condenser to impede or prevent the formation of sludge suspension in that part of the system. Since ethylene diamine is volatile and will pass into the condenser, and since it can be employed with a system constructed of materials of the character described herein and does not result in the formation of objectionable deposits within the system, I regard ethylene diamine as especially desirable as an anti-sludge agent.

In the accompanying drawing, the figure is a diagrammatic view showing a system in which the principles of the present invention are embodied.

The accompanying figure is illustrative of a simple system which may be constructed in accordance with the present invention, it being understood that in practice the same principles may be employed in more highly developed systems of the general character disclosed in my first above-identified application. The system disclosed herein is provided with a boiler or vaporizer 1 which normally contains a body of liquid mercury. A heating factor 2, which may be an electrical resistance element, is associated with the boiler. Mercury vapor from the boiler 1 passes through the riser 3 to the aspirator nozzle 4 from which mercury vapor issues at high velocity into the mixing chamber 5. The latter is connected by a vapor duct 6 to a cooler 7 which contains a body of liquid refrigerant. Refrigerant vapor is drawn from the cooler through duct 6 and is entrained in the stream of mercury vapor passing through the mixing chamber 5. The resulting stream of mixed vapors is received by the funnel 8 which is provided with suitable cooling means such as fins 10. The refrigerant vapor is compressed in this funnel while propellant vapor is condensed in the same. The condensed propellant is received by a drain 12 at the lower end of the funnel, while the refrigerant vapor flows through a vapor duct 14 to the refrigerant condenser 15.

Condensed refrigerant is received from the condenser 15 by a return pipe 16 having a trap 17 at its lower end which contains a body of mercury. Refrigerant liquid piling up in the pipe 16 develops a sufficient head so that some of the refrigerant may pass through the mercury in the trap and flow through the pipe 18 back to the cooler 7.

A trap 19 has one leg connected to the bottom of cooler 7 and its opposite leg is continued in a downwardly inclined pipe 20. The trap 19 contains a body of the propellant liquid, i. e., mercury, and when stray mercury is received from the cooler by this trap, the mercury may overflow into the pipe 20. The lower end of the drain 12 also communicates through a trap 12ᵃ with pipe 20 and the lower end of the latter is connected to a propellant return pipe 22. Pipe 22 is connected to the boiler 1 and contains a column of mercury to balance the boiler pressure. An upwardly extending continuation 22ᵃ of the pipe 22 is connected to the mixing chamber 4 to receive mercury particles which condense in this part of the system.

In accordance with this invention, a system of the type which is disclosed herein may initially be exhausted of air and non-condensable gases and be hermetically sealed. The system is then ready for continuous operation without a purger. In order, however, substantially to preclude the formation of non-condensable gases in the system, the condenser 15, the return duct 16 with the associated trap 17 and connection 18, the cooler 7, traps 12, 12ª and 19 and pipe 14 should be provided with surfaces to contact the liquid refrigerant that are substantially immune to attack by the refrigerant, it being understood that the various walls of the system are preferably formed of steel. Such resistant materials as stainless steel, for example, an alloy having around 18% of chromium and 8% of nickel, or chromium, may be employed for the surfaces which contact liquid refrigerant, or these parts may be constructed of conventional steel and be treated to convert their surfaces to provide metallic surfaces, such as formed by iron and manganese phosphates.

A system thus constructed may operate efficiently over a long period of time when employing a refrigerant consisting of a solution of ethylene diamine in water. The proportion of ethylene diamine in the refrigerant may vary in accordance with the temperature desired in the cooler. If only a moderately low temperature in the cooler is desired, a relatively small percentage of ethylene diamine is sufficient to impede the formation of a deleterious sludge in a system thus constructed, while if a temperature substantially below 32° F. is desired in the cooler, a greater proportion of ethylene diamine should be employed. Thus, for example, if a temperature below 10° F. is desired in the cooler, the solution may consist of approximately 25% by weight of ethylene diamine and approximately 75% by weight of water. When materials of the type described are employed for the wall surfaces of the condenser and the cooler and of the other parts of the system which may contact liquid refrigerant, ethylene diamine may be employed in substantial proportions without appreciable deterioration of the walls of the system. The formation of gaseous products is also substantially avoided so that a purger is not necessary.

When ethylene diamine is thus employed in the solution, the efficiency of the cooler and of the condenser may be of the same general order as would be the case if it were feasible to employ pure water as the refrigerant. The cooler may operate at a sub-freezing temperature and at a pressure of the order of that of supercooled water. The refrigerant may be pumped to a pressure in the condenser of the order of that required to condense water under similar conditions.

Ethylene diamine has a considerably higher molecular weight than the water but the proportion of ethylene diamine circulating in its vapor phase through the mixing chamber and funnel is substantially less than the proportion in the cooler. Accordingly, the average molecular weight of the refrigerant being entrained in the propellant vapor stream is not substantially greater than would be the case were pure water being pumped, and shock losses during aspiration are not unduly increased. However, some ethylene diamine circulates with the water through the condenser 15, thus impeding freezing of the condensate in pipe 18. Operation of the system at lower temperatures, without freezing of the refrigerant solution in this pipe, is permitted by the employment of trap arrangements associated with the return piping extending from the condenser to the cooler, such as are disclosed and claimed in my copending application Serial No. 171,325, filed October 27, 1937.

While the employment of ethylene diamine as an anti-sludge agent and/or as an anti-freeze agent is particularly desirable in systems of the type disclosed by the present invention, other volatile electrolytes such, for example, as morpholine, may be satisfactorily employed in a system constructed of materials which are inert in the presence of such electrolytes. While I prefer to employ a system having steel walls with metallic inner surfaces, it is evident that other materials may be employed if they are immune to interaction with the fluids in the system. In a system of this character, I contemplate employing solutions in water of one or more of the following: Ethylene diamine, methyl Cellosolve, ethyl Cellosolve, morpholine.

It is evident that the present invention permits a simple low pressure refrigerating system to be provided, permitting the elimination of the purger and retarding the tendency to form sludge.

It should be understood that the present disclosure is for the purpose of illustration only and that this invention includes all modifications and equivalents which fall within the scope of the appended claims.

I claim:

1. Refrigerating apparatus of the class described comprising a mercury circuit and a refrigerant circuit having a part in common where mercury vapor pumps refrigerant vapor, said mercury circuit including a boiler, a vapor duct leading from the boiler to said common part, said refrigerant circuit also including a condenser and a cooler, the cooler containing a body of liquid refrigerant of the type that tends to interact with ordinary steel and with mercury to cause the formation of sludge, said cooler having walls providing metallic surfaces to contact the liquid refrigerant substantially without interacting with the same and mercury to cause the formation of sludge.

2. Refrigerating apparatus of the class described comprising a propellant circuit and a refrigerant circuit having a part in common where mercury vapor pumps and compresses refrigerant vapor, said propellant circuit also including a boiler, a vapor duct connecting the boiler to said common part, and a return duct connecting said common part and the boiler, said refrigerant circuit also including a condenser and a cooler, the cooler containing a body of liquid refrigerant comprising a major portion of water and a minor portion of a liquid anti-sludge agent, said refrigerant being volatile at a small fraction of atmospheric pressure at 0° C., and being of a type which does not interact with mercury in the presence of the walls of the system to form a deleterious sludge.

3. Low pressure refrigerating apparatus of the class described comprising a refrigerant circuit and a propellant circuit with a part in common where propellant vapor pumps and compresses refrigerant vapor, the refrigerant circuit including a condenser and a cooler, said cooler containing a body of liquid refrigerant which is volatile at a small fraction of atmospheric pressure at 0° C., said system being hermetically sealed against leakage of gases into or out of the system, the condenser having its inner surface formed of material which does not appreciably tend to interact with the refrigerant liquid in causing the formation of non-condensable gases within the system.

4. Low pressure refrigerating apparatus of the class described comprising a refrigerant circuit and a propellant circuit with a part in common where propellant vapor pumps and compresses refrigerant vapor, the refrigerant circuit including a condenser and a cooler, said cooler containing a body of refrigerant including a mixture of a major portion of water and a minor portion of ethylene diamine, said system being initially exhausted of non-condensable gases and hermetically sealed against passage of gases into and out of the system, the cooler and condenser having their inner surfaces provided by stainless steel of a character which is substantially inert in the presence of water and ethylene diamine whereby the formation of deleterious sludge and of non-condensable gases is substantially prevented.

5. Low pressure refrigerating apparatus comprising a refrigerant circuit including a cooler and a condenser, pumping means to pump the refrigerant from the cooler to the condenser, said cooler containing a body of liquid refrigerant which is volatile at a small fraction of an atmosphere at 0° C., and which is condensable at room temperature at a pressure below atmospheric pressure, said refrigerant circuit being exhausted of non-condensable gases and being hermetically sealed against the passage of gases into or out of the system, the cooler and condenser being provided with inner surfaces of stainless steel which is substantially inert in the presence of the liquid refrigerant so that non-condensable gases are not formed in the system whereby the system may continue to operate indefinitely with the refrigerant circuit at a subatmospheric pressure.

6. Refrigerating apparatus of the class described comprising a propellant circuit and a refrigerant circuit having a part in common where mercury vapor pumps and compresses the refrigerant vapor, said propellant circuit also including a boiler, a vapor duct connecting the boiler to said common part, and a return duct connecting said common part and the boiler, said refrigerant circuit also including a condenser and a cooler, a body of liquid refrigerant contained in the cooler comprising water and an electrolyte, said refrigerant being volatile at a small fraction of atmospheric pressure at 0° C., and being of the type which does not interact with mercury in the presence of the walls of the system to form a deleterious sludge.

7. Refrigerating apparatus of the character described comprising a mercury-containing propellant circuit and a refrigerant circuit including a cooler containing an aqueous refrigerant, said refrigerant including ethylene diamine as an anti-sludge agent, said refrigerant circuit having inner surfaces for contacting the refrigerant liquid, which are substantially immune to attack by ethylene diamine and water.

8. Refrigerating apparatus of the character described comprising a mercury-containing propellant circuit and a refrigerant circuit including a cooler containing an aqueous solution of an electrolyte of a type which attacks ordinary steel, said electrolyte being of a type which impedes the formation of sludge by the mercury and refrigerant solution, parts of the system which contact the liquid solution being formed of material which is substantially immune to interaction with the solution.

9. Refrigerating apparatus of the character described comprising a mercury-containing propellant circuit, a refrigerant circuit including a cooler containing an aqueous solution, said solution being of a type which tends to interact with ordinary steel to produce hydrogen within the system, said cooler having surfaces which contact the liquid refrigerant provided by stainless steel of a type which is substantially immune to such interaction with the solution.

10. Refrigerating apparatus comprising a refrigerant circuit including a cooler and a condenser, a propellant circuit including a boiler containing mercury and a common part with the refrigerant circuit where propellant vapor entrains and pumps refrigerant vapor, the cooler containing an aqueous refrigerant comprising a minor percentage of a sludge inhibitor of a type which interacts with ordinary steel, the inner surface of the condenser being provided by material which is substantially inert in the presence of the refrigerant.

11. Low pressure refrigerating apparatus of the class described comprising a refrigerant circuit and a propellant circuit with a part in common where propellant vapor pumps and compresses refrigerant vapor, the refrigerant circuit including a condenser and a cooler, said cooler containing a body of liquid refrigerant which is volatile at a small fraction of atmospheric pressure at 0° C., said refrigerant being of a type which tends to interact with ordinary steel to cause the formation of non-condensable gases in the system, said refrigerant circuit having wall portions which do not substantially interact with the refrigerant to cause the formation of non-condensable gases within the system, whereby the system may be operated over a relatively long period of time without the formation of an objectionable quantity of non-condensable gases.

LYMAN F. WHITNEY.